INVENTORS.
DANIEL E. AXE
DAVID W. REMICK
BY Bruno and Jenney
Att'ys.

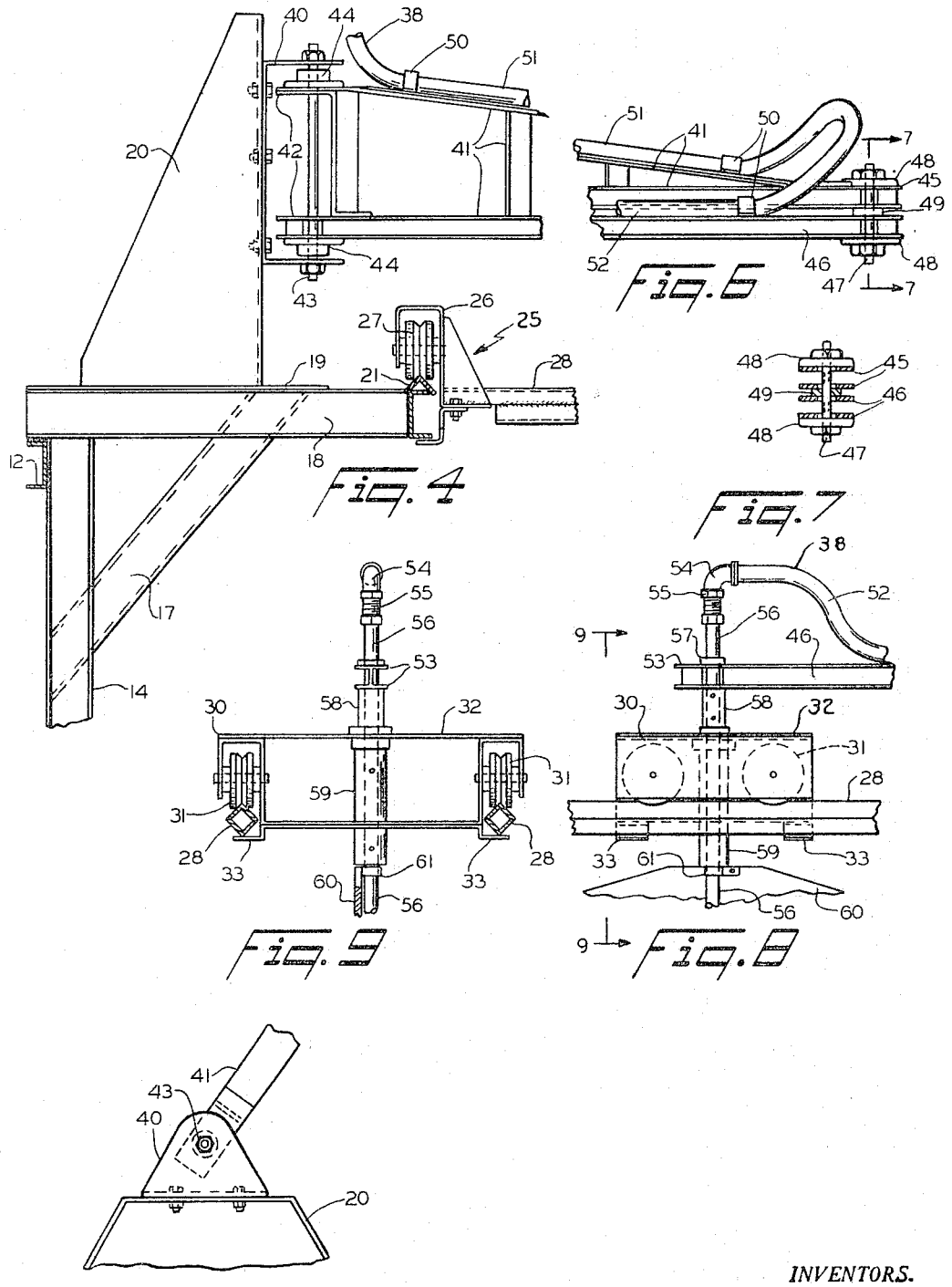

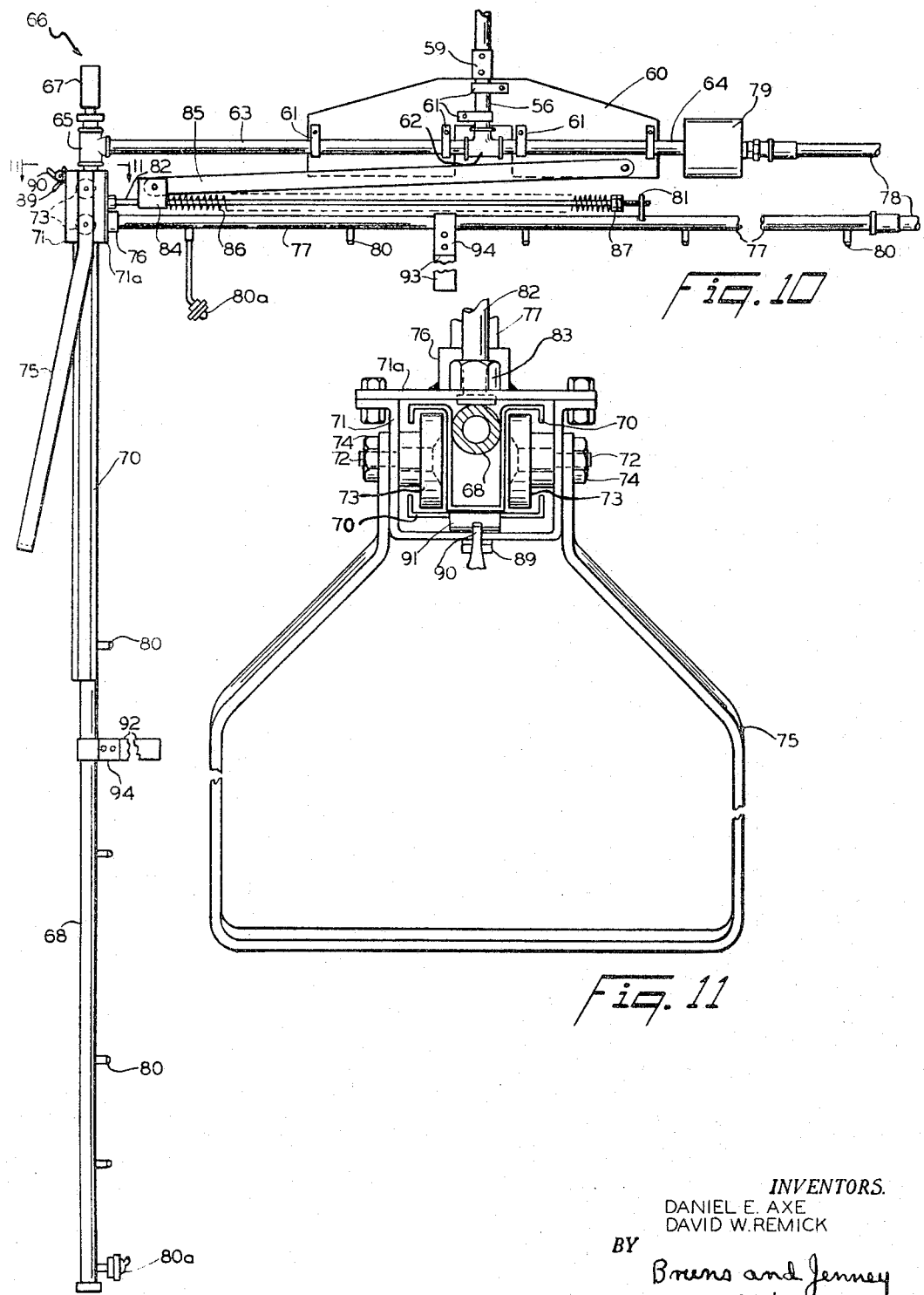

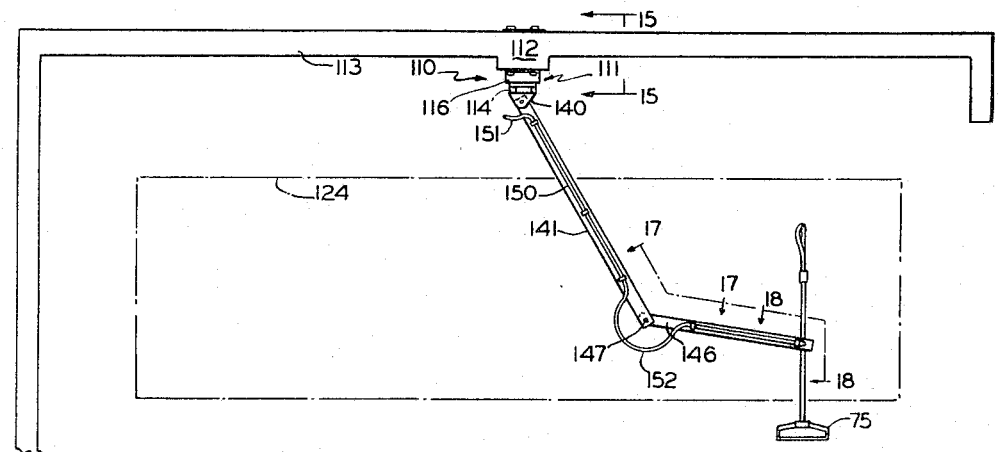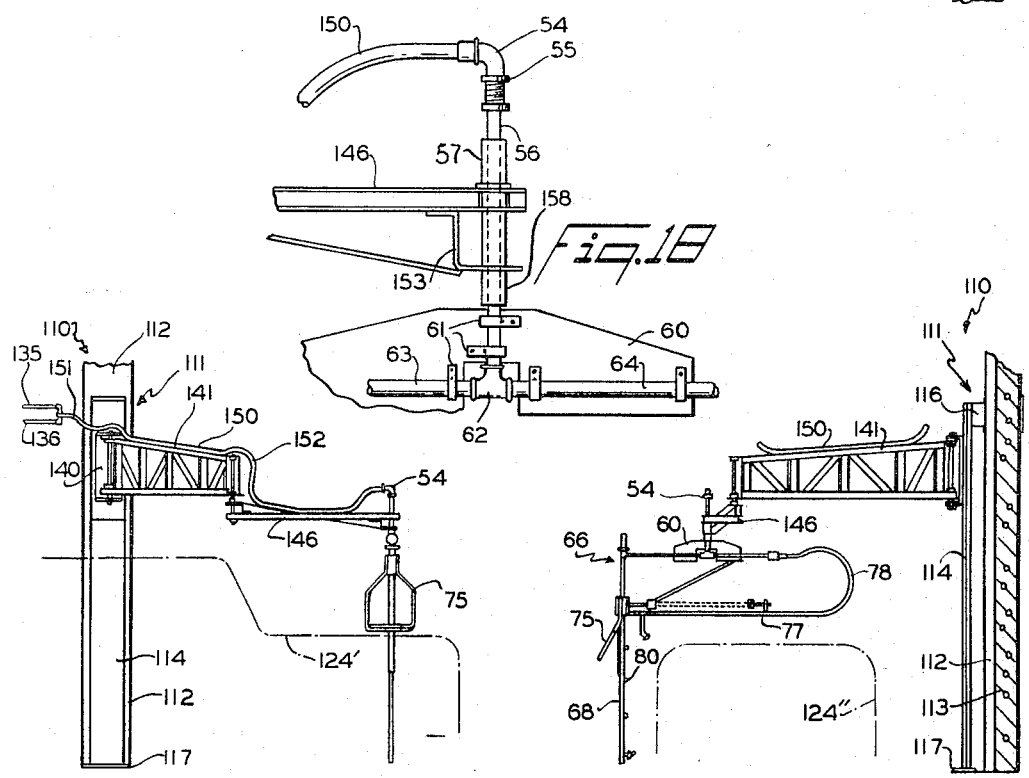

Jan. 24, 1967    D. E. AXE ETAL    3,299,901
CAR WASHING APPARATUS
Filed April 7, 1965    6 Sheets-Sheet 6
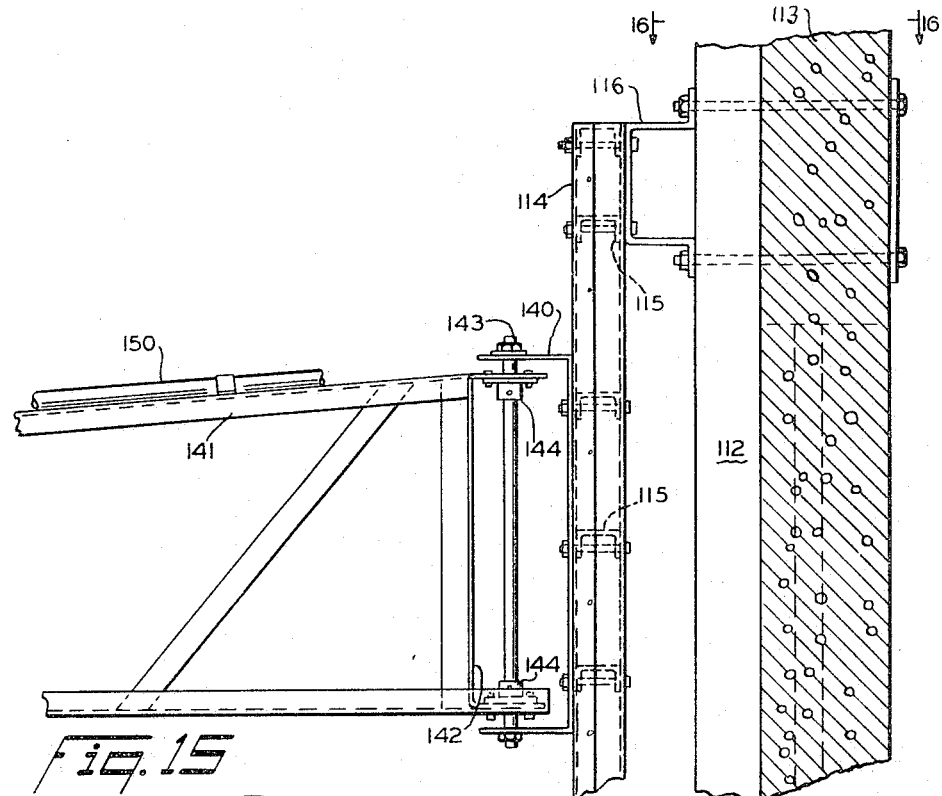
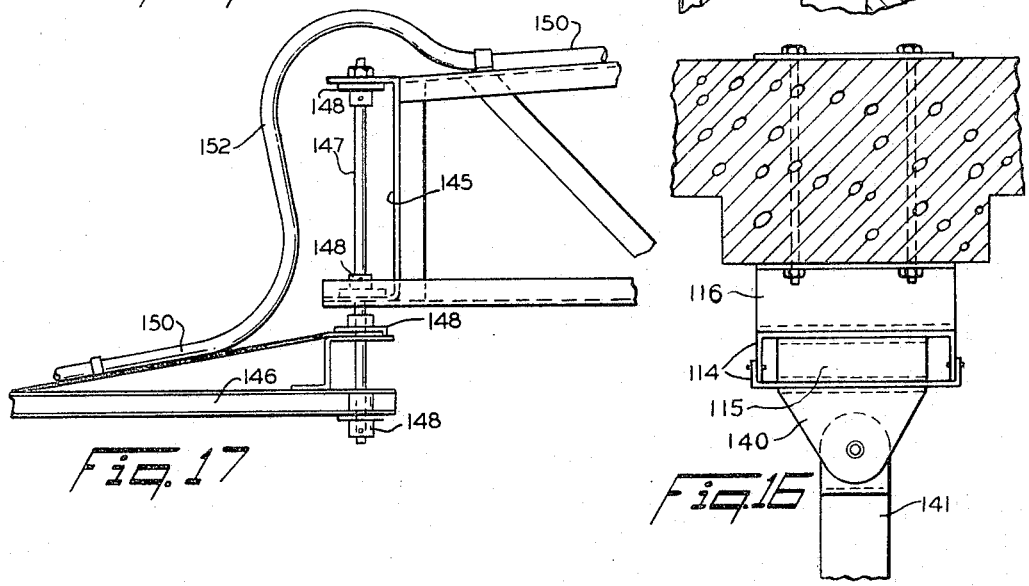
INVENTORS
DANIEL E. AXE
DAVID W. REMICK
BY
Bruns and Jenney
Att'ys United States Patent Office 3,299,901
Patented Jan. 24, 1967

3,299,901
CAR WASHING APPARATUS
Daniel E. Axe, Fayetteville, and David W. Remick, Camillus, N.Y., assignors to O. M. Edwards Company, Inc., Syracuse, N.Y., a corporation of New York
Filed Apr. 7, 1965, Ser. No. 446,331
9 Claims. (Cl. 134—123)

This invention relates to vehicular power-wash apparatus, and more particularly to apparatus utilizing a traveling spray unit having nozzle means for spraying liquid against the side and ends of the vehicle as the unit is moved around it, and for simultaneously spraying liquid down against the top surfaces of the vehicle.

The principal object of the invention is to provide a vehicle or car washing apparatus having a spray unit supported adjacent the car and movable around the car, the spray unit having means thereon for spraying liquid under pressure against the side of the car and for simultaneously spraying liquid downward on the top surfaces of the car, the downwardly directed spray means being movable up and down so as to be always at the most effective distance from the top surface which is being washed.

Another important object is to supply such an apparatus in which the spray unit is supported from above leaving the area in which the car is washed free for other equipment when the wash apparatus is not in use.

Still another object is to provide overhead support for the liquid conduit means that carries liquid under pressure to the spray unit so as to keep the work space under the overhead support unobstructed.

Other objects and advantages will become apparent from the following detailed description read in conjunction with the accompanying drawings, in which:

FIGURE 4 is an enlarged fragmentary sectional view on the line 4—4 of FIGURE 1;

FIGURE 5 is an enlarged top plan view of the hinged joint supporting the overhead arms of the apparatus;

FIGURE 6 is an enlarged fragmentary elevational view of the hinged joint between the overhead arms of the apparatus as viewed in FIGURE 3;

FIGURE 7 is a sectional view on the line 7—7 of FIGURE 6;

FIGURE 8 is an enlarged fragmentary elevational view of the transversely traveling cart portion of the apparatus as viewed in FIGURE 3;

FIGURE 9 is a sectional view thereof on the line 9—9 of FIGURE 8;

FIGURE 10 is an enlarged elevational view of the spray unit portion of the apparatus as viewed in FIGURE 3;

FIGURE 11 is an enlarged sectional view on the line 11—11 of FIGURE 10;

FIGURE 12 is a fragmentary top plan view of a modified form of apparatus according to the invention;

FIGURE 13 is a side elevational view thereof;

FIGURE 14 is an end elevational view thereof;

FIGURE 15 is an enlarged fragmentary sectional view on the line 15—15 of FIGURE 12;

FIGURE 16 is a fragmentary sectional view on the line 16—16 of FIGURE 15;

FIGURE 17 is an enlarged fragmentary elevational view of a portion of the apparatus as viewed in the direction of the arrows 17—17 of FIGURE 12; and FIGURE 18 is an enlarged fragmentary elevational view of a portion of the apparatus as viewed in the direction of the arrows 18—18 of FIGURE 12.

Figure 1:
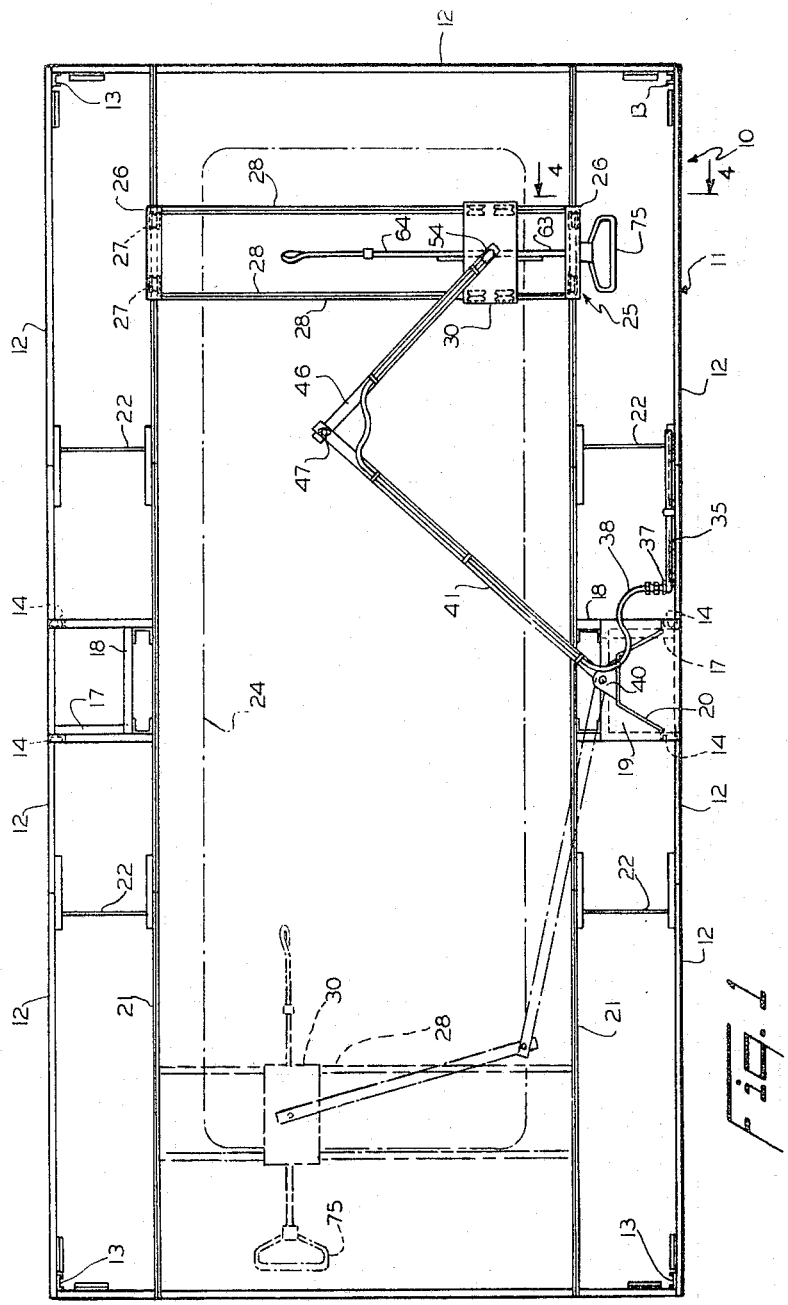
FIGURE 1 is a top plan view of one embodiment of car washing apparatus according to the invention.
Figure 2:
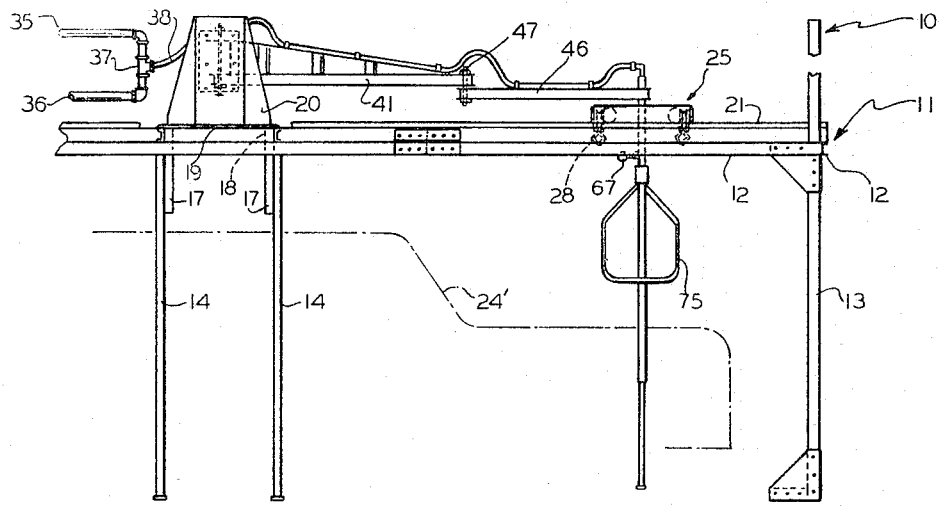
FIGURE 2 is a fragmentary side elevational view thereof.
Figure 3:
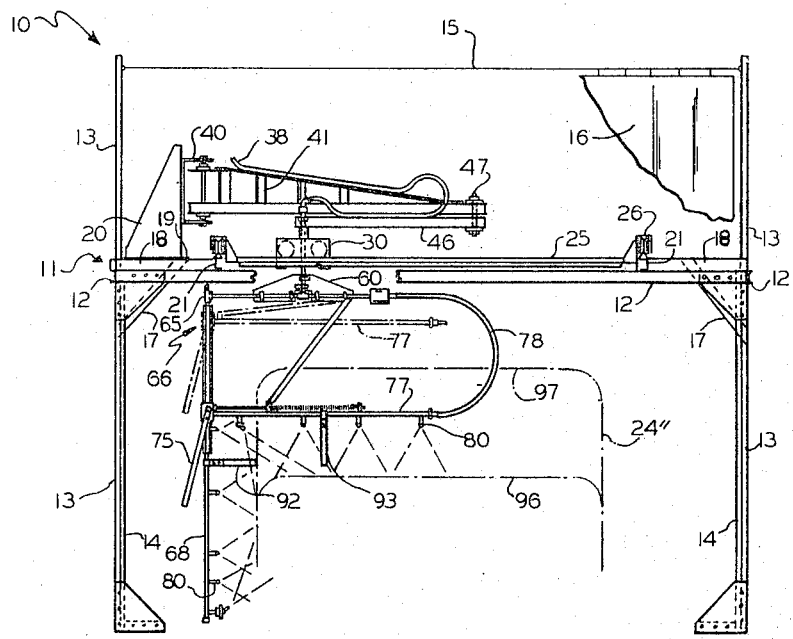
FIGURE 3 is an end elevational view thereof.

Referring first to the embodiment 10 shown in FIGURES 1–11, inclusive, a supporting frame 11 best seen in FIGURES 1–3 is erected on any convenient floor space and comprises rectangularly arranged horizontal members 12, four vertically extending corner leg member 13, and four vertically extending side leg members 14, all shown as channel members. The corner leg members 13 may extend up above the horizontal members 12, as shown in FIGURE 3, to support a wire 15 on one or more sides on which a curtain may be suspended as indicated fragmentarily at 16.

Side leg members 14, and suitable cross-brace members 17, support platforms 18 at the middle of each of the longer sides of the frame, the platform at one side being furnished with a horizontally disposed plate 19 to which is welded a bent, vertically disposed support plate 20 that forms the principal support for the overhead conduit-supporting arms hereinafter described.

Supported on the end horizontal members 12 and the platforms 18, two parallel tracks 21 extend lengthwise of frame 11 and are spaced from the side members 12 by suitable tie rods 22. As best seen in FIGURE 4, tracks 21 may be made by welding an inverted V-angle to the top of a channel member. Referring to FIGURE 1, the outline of a car having the maximum width of 80 inches is indicated in broken lines at 24 below the horizontal members 12, and tracks 21 are spaced farther apart than this maximum width.

As best seen in FIGURES 1 and 4, a traveling cart 25 is supported by the tracks 21. The cart comprises two end members 26 in each of which is journalled a pair of grooved rollers 27 rotatably engaged on a track 21 so that the cart 25 is movable longitudinally from end to end of frame 11. The end members 26 are connected together by a pair of parallel cross-tracks 28 which are shown in FIGURES 4 and 9 as a pair of angles welded together to form a square.

On the tracks 28, a second cart 30 is carried so as to be movable thereon tranversely of the frame 11. This second transversely movable cart 30 has a pair of grooved rollers 31 journalled therein at either end of the cart and rotatably engaged on the tracks 28. The cart 30 is provided at the top thereof with a platform 32 that is supported by the pairs of rollers 31, and guide members 33 project from the bottom of the cart and slidably engage the bottoms of the tracks 28 to secure the cart thereon as best seen in FIGURE 9.

It will be understood that the car wash apparatus of the present invention is of the power-wash type and, as best seen in FIGURES 1 and 2, two liquid conduit lines 35 and 36 are supported on the frame 11 or, alternatively, on the building wall adjacent thereto. Lines 35 and 36 terminate in a T 37 adjacent the support plate 20, and through the T 37 each is connected to a flexible fluid conduit 38.

Line 35 is the rinse line and is connected to a source of rinse liquid comprising water under pressure. Line 36 is the detergent line and it is connected to a source of detergent mixed with water and subjected to pressure by means of a pump, not shown. Suitable valves, also not shown, controlled from a convenient point such as below the support plate 20, are provided to alternatively supply the conduit 38 with a continuous flow of liquid detergent under pressure or a continuous flow of rinse water under pressure in conventional manner.

Bolted to the support plate 20, as best seen in FIGURE 4, a U-shaped bracket 40 forms one-half of a hinged connection with a cantilever arm 41, the other half of the hinge being the U-shaped inner end 42 of the arm. A vertically extending bolt 43 forms the pivot of the hinge and two bearings 44, 44, each having one race secured to the bolt and the other race to the arm end 42, provide for free swinging of the arm 41 from side to side and also provide thrust support.

As best seen in FIGURE 6, the outer end 45 of cantilever arm 41 is of I-beam configuration and is pivotally secured to the inner end of an extension arm 46, which is also of I-beam configuration. A vertically extending bolt 47 forms the pivot for this pivotal connection, passing through suitable holes through the central web portion of the I-beam structures. Two bearings 48, 48 permit thrust resistant horizontal swinging of arm 46 with respect to arm 41, and a spacer 49 separates the two arms.

The flexible conduit 38 extends along arms 41 and 46 and is secured thereto by appropriate clips 50. Alternatively, portions 51 and 52 of the conduit 38 may be non-flexible, only the loops at either end of arm 41 being flexible.

At the outer or free end 53 of arm 46 a rotary connection is made with the cart 30 as best seen in FIGURES 8 and 9. Portion 52 of the conduit 38 is connected by an L 54 to one end of a commercially available rotatable union 55. The other end of the union 55 is connected to a pipe 56 which acts as the pivot for the rotary connection. A collar 57 secured to the pipe holds the pipe in position on the arm end 53, and the pipe extends down through an appropriate hole in the arm 46. A sleeve 58 on pipe 56 supports the end of the arm on the cart 30, the pipe passing down through an appropriate hole in platform 32 of the cart. A sleeve 59 secured to the pipe below the platform rotatably connects the pipe to the platform.

Referring now to FIGURE 10, a spray unit support plate 60 is secured to pipe 56 below sleeve 59 by appropriate straps 61. Pipe 56 ends in a T 62 to which are connected horizontally extending pipes 63 and 64, likewise secured to plate 60 by straps 61.

The pipe 63 ends in a T 65 which is spaced from the pivot pipe 56 approximately one-third the total width of the spray unit 66 as indicated in FIGURE 3. At its top T 65 is connected to a pressure gauge 67 and at its bottom, to the vertically disposed tubular leg 68 of the spray unit 66 which leg extends downward and terminates in a cap just short of the floor.

Referring to FIGURE 11, a U-shaped track 70 is secured as by welding along either side of the upper portion of the leg 68. A box-shaped carriage 71 surrounds the leg and tracks, a removable face plate 71A forming the side of the carriage under the pipe 63 and being bolted to the remainder of the carriage.

Secured to either side of carriage 71 by shouldered bolts 72 are pairs of rollers 73 which are rotatably engaged in the tracks 70 so that the carriage is movable up and down on the upper portion of the spray unit leg 68. Also secured to the carriage 71 by the bolts 72 and nuts 74 is a downwardly and outwardly projecting stirrup-shaped handle 75 by which all movements of the spray unit 66 around and over the car can be controlled by gripping the two sides of the handle.

A pipe cap 76 is welded to the carriage face plate 71a, and projecting from the cap is a pipe 77 which forms the horizontal leg of the spray unit 66. The other end of leg 77 is connnected to a flexible conduit 78 which is also connected to the outer end of the pipe 64. A counterweight 79 may be secured to the pipe 64 to help balance the spray unit 66 in relation to its pivotal pipe 56.

At spaced intervals along legs 68 and 77 are a plurality of aligned spray nozzles 80 communicating with the interior of the tubular member on which they are secured. Certain of the nozzles 80a may be angularly disposed, as shown, but the nozzles 80 in horizontal leg 77 are aligned and disposed so as to spray liquid downward on the top surface of the car. Nozzles 80 on the vertical leg 68 are aligned and disposed so as to spray liquid horizontally toward the sides and ends of the car in the direction in which the leg 77 extends.

Near the outer end of the leg 77 an upwardly projecting lug 81 is welded. A rod 82 passing through the appropriate hole in lug 81 has its other end secured by a nut 83 to face plate 71a of the carriage as shown in FIGURE 11. A traveling lug 84, slidable on rod 82, is pivotally secured to one end of a counterbalance and stop arm 85, the other end of arm 85 being pivotally secured to the support plate 60 as shown in FIGURE 10. A compression coil spring 86 is mounted on the rod 82 between lug 84 and lug 81, and an adjusting nut 87 may be threaded on the rod for adjusting the spring bias against the traveling lug 84. When carriage 71, which carries the horizontal leg of the spray unit, is moved downward, the spring 86 is compressed so as to counterbalance the weight of carriage 71 and associated parts.

Carriage 71 has secured thereto a lug 89 which carries a spring biased hooked catch 90 that is engageable with a projecting tongue 91 bent out from a member secured to the upper end of tracks 70. When the spray unit 66 is not in use, the carriage 71 is run up to the top of tracks 70 and catch 90 automatically engages with tongue 91 keeping the horizontal leg 77 up out of the way. By manually depressing the outer end of the catch 90 the carriage 71 can be again disengaged when desired.

Legs 68 and 77 are provided with stops or feelers 92 and 93 respectively, each secured to its leg by a clamp 94. Feelers 92 and 93 are formed of a soft but highly resident plastic material to prevent marring of the car finish, but are stiff enough to prevent the nozzles on either leg from coming too close to the car being washed.

In operation, the pump or other means for supplying detergent to line 36 is turned on, the valve to the rinse line 35 being closed, and washing is started at one corner of the car. By grasping handle 75, the operator moves the spray unit 66 to the position shown in full lines in FIGURE 1 and moves to his left keeping the spray nozzles 80 on vertical leg 68 at the optimum effective distance from the side of the car by observation and the contact of feeler 92 against the side of the car. Hook 90 is disengaged and, by moving handle 75 downward, the spray nozzles 80 on horizontal leg 77 are brought down to their proper distance over the hood or back of the car which is indicated at 96 in FIGURE 3. Feeler 93 prevents arm 77 from approaching the top surface of the car too closely.

It will be understood that the hereindescribed apparatus is peculiarly adapted for practicing the method described in Patent 3,142,590 to Hergonson, issued July 28, 1964, wherein the correct spacing of the nozzles 80 from the surfaces to be washed is particularly important.

As the operator moves to the left he reaches a higher portion of the car, indicated at 97 in FIGURE 3, and by raising handle 75 the leg 77 is raised to the proper distance above the top of the cab of the car. Detergent mix from nozzles 80 is sprayed with considerable force against the side and top surfaces of the car as the operator moves to his left.

As handle 75 is moved to the left the longitudinally traveling first cart 25 is carried on tracks 21 to the left, motion being transmitted from the handle through carriage 71, pipe 63, support plate 60, and cart 30 to the tracks 28 of the first cart. As the first cart 25 moves to the left in FIGURE 1, arms 46 and 41 are moved to the left and arm 46 is swung toward arm 41. During such movement, movable second cart 30 moves left in a straight line, the lateral position of the cart being determined by the distance nozzles 80 on vertical leg 68 are spaced from the side of the car.

The length of arm 46 is considerably longer than half the length of arm 41 and for this reason arm 41 is pushed ahead of arm 46 and the latter approaches but never reaches alignment with arm 41 and never passes under it. Soon after the cart 30 passes the pivot 40 of arm 41, the arms again diverge as arm 41 continues to swing counter-clockwise until the spray unit 66 reaches the end of the car being washed and is swung around the end thereof by handle 75.

As vertical leg 68 is guided across the end of the car, arm 46 now pulls leg 41 behind it while the arms diverge and the transversely traveling cart 30 moves along the tracks 28 of cart 25 past the position indicated in broken lines in FIGURE 1 to the next corner. Handle 75 is there again carried around the corner, turning the spray unit 66 on its pivot on cart 30 to direct spray from the vertical leg 68 against the far side of the car.

As the spray unit is moved from left to right (FIGURE 1) along the far side of the car, the longitudinally movable cart 25 is again moved from one end of the car to the other. Arm 46 pulls arm 41 behind it, the arms first converging, and then diverging until the spray unit 66 is again turned at the corner and brought back to the starting point at the other end of the car. At this end of he car, arms 41 and 46 again converge and cart 30 again moves transversely on the tracks 28 of cart 25 until the starting point is reached.

Detergent line 36 is then closed and rinse line 35 is opened and the operation is repeated rinsing the detergent from the car.

It will be noted that, since arms 41 and 46 never become aligned and arm 41 swings transversely on its pivot from one end of the car to the other, the flexible hose at either end of the cantilever arm 41 never is twisted but simply flexes in and out as arm 41 swings from side to side and arms 41 and 46 converge and diverge. The conduit 38, however, from its connection with the supply line T 37 to its connection with the pivot pipe 56, is supported above the space occupied by the car without any necessity for supports for the conduit sliding back or forth as is frequently necessary with other car wash apparatus.

Since the spray unit 66 is turned in the same direction on its pivot about pipe 56 at each corner of the car, the rotary coupling 55 is turned a single revolution for each trip of the spray unit 66 around the car.

For each trip of the spray unit in one direction or the other, along the side of the car, the spray nozzles 80 on vertical leg 68 can be maintained by the operator at their optimum effective distance from the side of the car, close enough to maintain the full effect of the spray from each nozzle at the surface of the car but not so close that sprays are direced at localized nonoverlapping separate areas. Similarly, since the horizontal leg 77 of the spray unit 66 is movable on the tracks 70 under control of the handle 75, the operator can follow the silhouette of the car with the horizontal leg thus keeping the nozzles 80 thereon at their opimum effective distance from the top surfaces of the car being washed.

The weight of the spray unit 66 is supported by the cart 30 and the counterbalance spring 86 effectively supports the weight of the horizontal leg 77 and associated parts. Effort on the part of the operator, therefore, is limited substantially to the movement of cart 25 or cart 30 on their respective tracks and to swinging arms 41 and 46 from side to side. Since all pivots are provided with ball or roller bearings, little effort is required of the operator.

Referring now to FIGURES 12–18, inclusive, modified apparatus will now be described having a minimum of supporting framework.

The apparatus 110, shown in FIGURES 12, 13 and 14, comprises a supporting frame 111 which includes a reinforced portion 112 of the wall 113 adjacent which a car is to be washed, and a post member 114 extending up from the floor on which the car is positioned. Post 114 is a box-like structure formed of two channel elements secured together as best seen in FIGURE 16 and reinforced at appropriate points by short transversely extending channel members 115 as best seen in FIGURE 15.

A U-shaped bracket 116, bolted to the wall and to post 114 as shown in FIGURE 15, and a foot 117 secure the post in spaced relation to the wall.

Bolted to the post 114 is a U-shaped bracket 140, best seen in FIGURE 15, which forms one-half of a hinged connection with a cantilever arm 141, the other half of the hinge being the U-shaped inner end 142 of arm 141. A vertically extending bolt 143 serves as a pivot of the hinge and combination rotary and thrust bearings 144 secure the arm end 142 rotatably on bolt 143.

The outer end of arm 141 is provided with a U-shaped bracket 145, and the U-shaped inner end of an extension arm 146 is rotatably secured below bracket 145 by the vertically extending bolt 147, as best seen in FIGURE 17. Combination rotary and thrust bearings 148 secure the ends of both arms rotatably on bolt 147.

Appropriate rinse and detergent lines 135 and 136 on wall 113, FIGURE 13, are provided to alternately supply detergent and rinse liquid to a flexible conduit 150 which is secured along arms 141 and 146 with appropriate free loops at 151 and 152.

At the outer end of the extension arm 146 the spray unit 66, as shown in FIGURE 10, is rotatably secured in a manner best seen in FIGURE 18. The outer end of arm 146 is provided with a Z bracket 153 to give the arm torque-resistant depth. The pivot pipe 56 from which spray unit 66 depends extends vertically down through appropriate holes in arm 146 and bracket 153, and the conduit 150 that is carried by arm 146 terminates in an L 54 connected to the rotatable union 55 which, in turn, is connected to the pipe 56. Collar 57 and sleeve 158 are secured to pipe 56 to hold the latter in position on the end of arm 146.

The spray unit support plate 60 is secured by straps 61 to the pivot pipe 56 and the pipes 63 and 64, the pipes 56, 63, and 64 being connected together by the T 62 as described above for the apparatus 10.

Apparatus 110 is, therefore, similar to apparatus 10 except for the supporting frame 111. The outer end of arm 146 is not supported by a frame and cart arrangement as in the apparatus 10 but is supported entirely by the arm 141 which is consequently made stronger than the cantilever arm 41 of apparatus 10. The spray unit 66 of apparatus 110 is supported from the extension arm 146 but otherwise is the same as in apparatus 10.

Operation of apparatus 110 is likewise the same as described above for apparatus 10. The operator grasps the handle 75 of the spray unit 66 and walks the unit around the car. The movement of the arms 141 and 146 is the same as described above for arms 41 and 46. The operation of the horizontal leg 77 which is movable under control of handle 75 up or down on the vertical leg 68 is also the same, the operator following the silhouette of the car being washed, the silhouette being indicated in broken lines 124' in FIGURE 13.

The conduit 150, supplying detergent and rinse liquid to the spray unit 66, is secured overhead on arms 141 and 146 leaving the floor space unencumbered. When the apparatus is not in use the spray unit 66 may be swung to one side out of the way.

It will be noted that the supporting hinge 140, 142, 143 for the arm 141 is spaced away from the wall 113 so that the arms 141 and 146 may be swung away from the car, indicated at 124 in FIGURE 12, toward the wall 113 when the operator is working on the side of the car nearest the wall in FIGURE 12.

As will be apparent to those familiar with the art, the invention may be embodied in other specific forms without departing from the spirit or essential characteristics thereof. The embodiments disclosed are therefore to be considered in all respects as illustrative rather than restrictive, the scope of the invention being indicated by the appended claims.

What is claimed is:

1. Car wash apparatus comprising a supporting frame, a cantilever arm hingedly supported on the frame and swingable in a horizontal plane above the car, a horizontally swingable extension arm hingedly secured to the end of the cantilever arm, and a spray unit rotatably supported at the end of the extension arm and having a horizontal leg and a vertical leg, said arms carrying liquid conduit means for supplying liquid under pressure to the spray unit, said legs being provided with means for directing jets of liquid at the sides and top of the car, said horizontal leg being adjustable up and down with respect to the vertical leg whereby the horizontal leg can follow the contour of the upper surface of the car.

2. Car wash apparatus comprising a supporting frame, a first overhead horizontally swingable arm hingedly supported at one end on the frame, a second overhead horizontally swingable arm hingedly supported at one end by the outer end of the first arm, a spray unit rotatably suspended from the outer end of the second arm, the spray unit having a vertical leg laterally offset from the outer end of the second arm and a horizontal leg slidably secured to the vertical leg for adjustment relative to the top of the car, aligned and spaced spray nozzles on each leg for directing liquid at the car, and liquid conduit means connected to a supply of liquid under pressure and extending along the overhead arms for conducting liquid under pressure to the spray nozzles, the conduit means including flexible conduit at both ends of the first overhead arm and between the spray unit legs.

3. Car wash apparatus comprising a supporting frame, a cantilever arm hingedly secured to the frame and swingable horizontally over a car, a horizontally swingable extension arm hingedly secured to the free end of the cantilever arm, a spray unit having a horizontal leg and a vertical leg, the spray unit being rotatably pendant from the free end of the extension arm, a source of liquid under pressure, liquid supply conduit means including flexible hose supported by the arms above the car for supplying liquid under pressure to the spray unit, each leg of the spray unit including pipe means having aligned and spaced spray nozzles therealong for directing liquid at the car, connecting conduit means including a rotary union connection at the end of the extension arm and a flexible hose connected to the horizontal leg, the connecting conduit means connecting the supply conduit means and the pipe means, the horizontal leg being slidably secured to the vertical leg for limited movement up and down with respect thereto, each leg having feeler means thereon for positioning the spray nozzles at an optimum effective distance from the car, and means secured to the horizontal leg for guiding the vertical leg around the car with the nozzles thereon directed toward the car and for moving the horizontal leg up and down following the contour of the top of the car with the nozzles thereon directed downward from above the car and at an optimum distance from all portions of the top of the car.

4. Car wash apparatus as defined in claim 3 wherein the spray unit is supported by said arms.

5. Car wash apparatus as defined in claim 3 having a track means extending the length of the frame, first cart means supported on said track means and movable lengthwise of the frame, cross tracks on said first cart means extending across the frame, and a second cart supported on the cross tracks and movable transversely of the frame above the car to be washed, the spray unit being rotatably supported on said second cart.

6. In vehicle power wash apparatus having a movable spray unit, means for supporting the spray unit as it is moved around the vehicle, and liquid supply conduit means for continuously delivering liquid under pressure to the spray unit; the improvement comprising: a spray unit including a vertical leg having a plurality of spray nozzles at linearly spaced intervals therealong for delivering jets of liquid laterally against the sides of the vehicle, and a horizontal leg having a plurality of spray nozzles at linearly spaced intervals therealong for delivering jets of liquid downward on the top surface of the vehicle, each leg including liquid conduit means connected to the supply conduit means for conducting liquid under pressure to the spray nozzles, the horizontal leg being slidably supported on the vertical leg and movable up and down thereon for adjustably regulating the height of the horizontal leg for following the top surface silhouette of the vehicle as the spray unit is moved from one end of the vehicle to the other.

7. In vehicle power wash apparatus having a movable spray unit, means for supporting the spray unit as it is moved around the vehicle, and liquid supply conduit means for the spray unit adapted to continuously deliver liquid under pressure thereto; the improvement comprising: the spray unit being rotatably suspended from the supporting means and having a horizontal leg and a vertical leg, each leg including a pipe connected to the liquid supply conduit means and having aligned spray nozzles at spaced intervals along the pipe for directing liquid toward the vehicle to be washed, the horizontal leg having its nozzles directed downward, the vertical leg having track means therealong at its upper end, the horizontal leg having at one end means engaging the track means and slidably securing the horizontal leg to the vertical leg and orienting the horizontal leg in the direction in which the vertical leg nozzles face, and handle means secured to the horizontal leg for guiding the vertical leg with its nozzles directed toward the vehicle and for moving the vertical leg around the vehicle while moving the horizontal leg up and down so as to follow the contour of the top of the vehicle.

8. A spray unit as defined in claim 7 having spring means biasing the horizontal leg thereof upward on the vertical leg to compensate for the weight of the horizontal leg.

9. A spray unit as defined in claim 7 having feeler means projecting toward the car from each leg, the feeler means terminating in portions formed of a soft material so as not to mar the washed surface of the vehicle, and the feelers being of such length as to prevent their associated leg from being guided closer than the optimum distance from the vehicle for efficient washing by the liquid sprayed from the nozzles.

References Cited by the Examiner

UNITED STATES PATENTS

| | | |
|---|---|---|
| 883,132 | 3/1908 | Goff. |
| 2,321,983 | 6/1943 | Brackett. |
| 2,790,679 | 4/1957 | Martindale _____ 239—209 X |
| 3,035,293 | 5/1962 | Larson. |
| 3,072,130 | 1/1963 | Grabenhorst _____ 134—123 X |

CHARLES A. WILLMUTH, *Primary Examiner.*